(12) United States Patent
Gauß

(10) Patent No.: US 12,358,103 B2
(45) Date of Patent: Jul. 15, 2025

(54) VALVE APPARATUS AND VACUUM HANDLING APPARATUS HAVING A VALVE APPARATUS

(71) Applicant: J.Schmalz GmbH, Glatten (DE)

(72) Inventor: Jan Gauß, Freudenstadt (DE)

(73) Assignee: J.SCHMALZ GMBH, Glatten (DE)

( * ) Notice: Subject to any disclaimer, the term of this patent is extended or adjusted under 35 U.S.C. 154(b) by 15 days.

(21) Appl. No.: 18/410,724

(22) Filed: Jan. 11, 2024

(65) Prior Publication Data

US 2024/0238945 A1 Jul. 18, 2024

(30) Foreign Application Priority Data

Jan. 18, 2023 (DE) ...................... 10 2023 101 130.8

(51) Int. Cl.
*F16K 15/18* (2006.01)
*B25B 11/00* (2006.01)
*F16K 37/00* (2006.01)

(52) U.S. Cl.
CPC .......... *B25B 11/005* (2013.01); *F16K 15/184* (2021.08); *F16K 37/0091* (2013.01)

(58) Field of Classification Search
CPC ........................... F16K 15/184; F16K 37/0091
See application file for complete search history.

(56) References Cited

U.S. PATENT DOCUMENTS 6,019,126 A * 2/2000 Kelada ................ F16K 37/0083
137/554
8,678,776 B2 3/2014 Medow et al.
(Continued)

FOREIGN PATENT DOCUMENTS

CN 208 221 717 U 12/2018
DE 35 08 151 A1 9/1986
(Continued)

OTHER PUBLICATIONS

Examination Report for Application No. 10 2023 101 130.8, dated Sep. 7, 2023 with English translation, 8 pages.
(Continued)

*Primary Examiner* — P. Macade Nichols
(74) *Attorney, Agent, or Firm* — CARTER, DELUCA & FARRELL LLP

(57) ABSTRACT

The invention relates to a valve apparatus (10) for vacuum applications, comprising a valve housing (20) which delimits a valve chamber (22), the valve chamber comprising a vacuum supply opening (28), a suction opening (32), and a ventilation opening (36); comprising a valve body (40) which is arranged in the valve chamber and can be displaced along a switching axis (38) between a suction position and a ventilation position, wherein the valve body in the suction position closes the ventilation opening and in the ventilation position closes the vacuum supply opening; comprising a bistable actuator (50) for driving a displacement movement of the valve body, the actuator comprising an armature (52), connected to the valve body, and an electromagnetic coil (54) for driving a displacement movement of the armature; and comprising a swing check valve (74) for opening and closing the vacuum supply opening (28). The invention also relates to a vacuum handling apparatus (100) comprising a valve apparatus (10).

17 Claims, 6 Drawing Sheets

(56) References Cited

U.S. PATENT DOCUMENTS

| | | | |
|---|---|---|---|
| 11,549,502 B2 | 1/2023 | van der Merwe et al. | |
| 2007/0028665 A1* | 2/2007 | Kim .................... | F16K 37/0091 |
| | | | 73/1.72 |
| 2010/0163766 A1 | 7/2010 | Alvarez et al. | |
| 2018/0369996 A1 | 12/2018 | Meyer et al. | |
| 2021/0371214 A1 | 12/2021 | Buffat et al. | |

FOREIGN PATENT DOCUMENTS

| | | |
|---|---|---|
| DE | 10 2008 005 241 A1 | 7/2009 |
| DE | 10 2018 217103 A1 | 4/2020 |

OTHER PUBLICATIONS

European Search Report for Application No. 24150381.2 dated Jun. 5, 2024 with English translation, 24 pages.

* cited by examiner

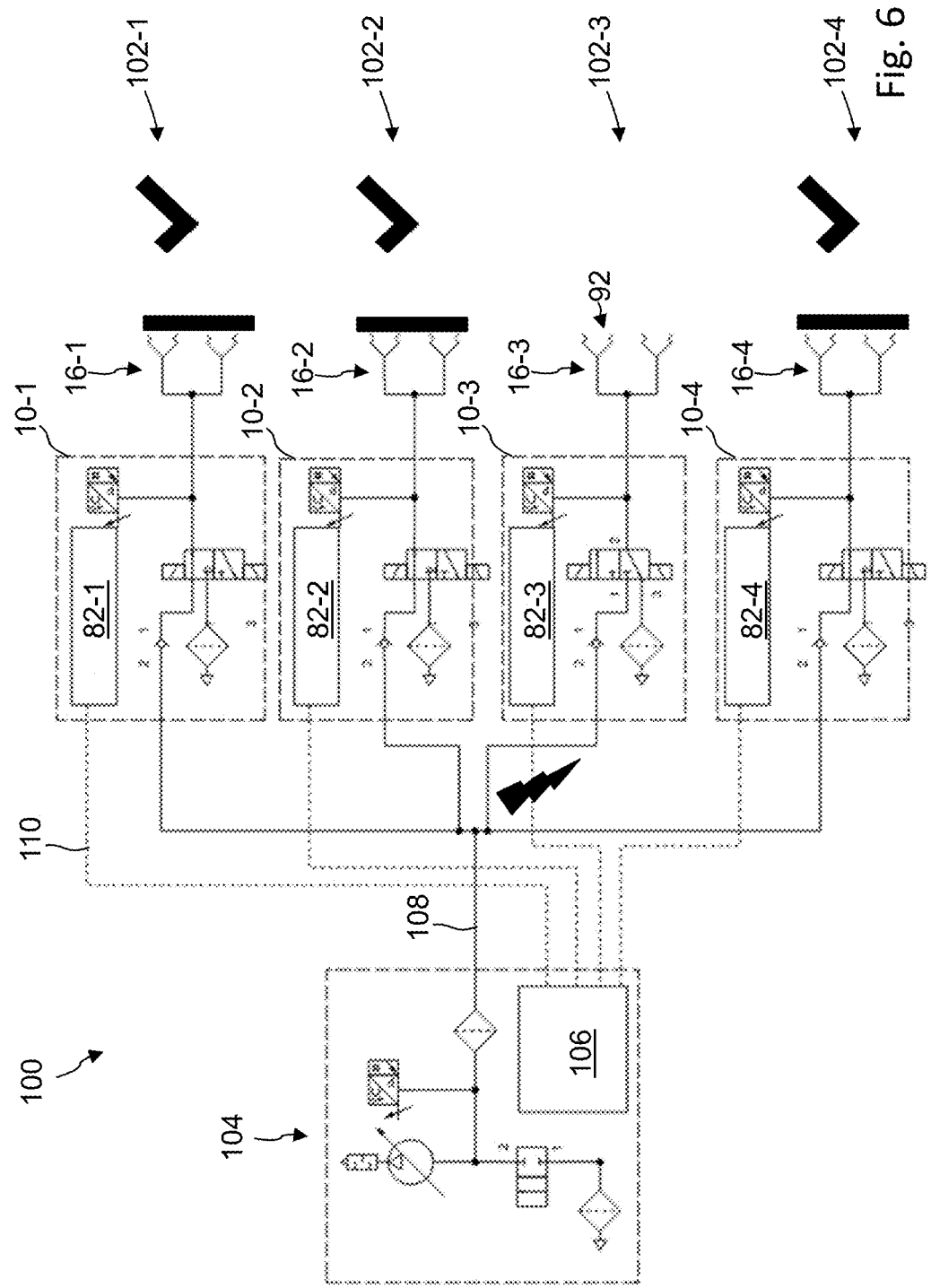

VALVE APPARATUS AND VACUUM HANDLING APPARATUS HAVING A VALVE APPARATUS

BACKGROUND

The invention relates to a valve apparatus for vacuum applications and to a vacuum handling apparatus having such a valve apparatus.

Vacuum handling apparatuses serve for gripping and handling objects by means of vacuum. Such vacuum handling apparatuses are used in a number of fields of application, and usually comprise one or more suction grip devices for gripping an object with suction, as well as a vacuum generating device supplying the suction grip devices with vacuum. The suction grip device can in particular be held on a manipulator, e.g., on a robot, and can be moved by it.

In order to control a vacuum source of the suction grip devices, and thus a gripping process, valve apparatuses are generally provided which establish or block a fluid connection between the vacuum generating device and the suction grip device as needed. The known valve apparatuses are usually actuated pneumatically, and in particular by means of compressed air. However, such a compressed air control process makes it necessary to maintain a comparatively cost-intensive and energy-intensive compressed air supply network. In addition, a compressed air supply is not always feasible, or can only be realized with great effort—for example, in the case of mobile vacuum handling apparatuses (for example, driverless transport systems, shuttles, battery-operated systems).

A further potential for improvement in known vacuum handling apparatuses arises from the fact that the suction grip devices are often not monitored individually by sensors; instead, only the vacuum circuit shared by all of them is. This has the disadvantage that, for example, it is not possible to unambiguously identify which of the suction grip devices has a fault—for example, a leakage.

SUMMARY

The invention is based upon the object of overcoming the disadvantages of the prior art. In particular, the object of the invention is to provide a valve apparatus which has a compact design, enables reliable, fast, and energy-efficient control of a vacuum source, and is also operationally reliable.

This object is achieved according to the invention by a valve apparatus having the features of claim 1. The valve apparatus is designed for vacuum applications, and in particular for applying or disconnecting a vacuum. In this respect, the valve apparatus can in particular be a switching valve for applying or disconnecting a vacuum, and more particularly a control valve for controlling a vacuum source.

The valve apparatus comprises a valve housing which delimits a valve chamber. In particular, the valve housing encloses an internal valve space forming the valve chamber. The valve chamber comprises a vacuum supply opening. The vacuum supply opening is fluidically connected to a vacuum connection for connecting an external vacuum source, and in particular a vacuum generating device. In particular, a flow channel—preferably in the valve housing—can be provided between the vacuum supply opening and the vacuum connection. The vacuum connection can be designed, for example, as a plug bushing, or can comprise a screw-in thread.

The valve chamber also comprises a suction opening. The suction opening is fluidically connected to a suction connection used for connecting a suction grip device. In particular, a flow channel—preferably in the valve housing—can be provided between the suction opening and the suction connection. The suction connection can be designed for, in particular, a direct connection to a suction element, e.g., an elastomer suction element, of the suction grip device. It is also conceivable for the suction connection to be designed to connect to a vacuum distributor line of the suction grip device. The suction connection can be designed, for example, as a plug bushing, or can comprise a screw-in thread. Furthermore, the suction connection can have a protective filter, and in particular a press-in protective filter.

The valve chamber also comprises a ventilation opening for ventilating the valve chamber. The ventilation opening is preferably fluidically connected to a surrounding environment of the valve apparatus, so that ambient air can flow into the valve chamber for ventilation.

The valve apparatus also comprises a valve body which is arranged in the valve chamber and can be displaced along a switching axis between a suction position and a ventilation position. The valve body is designed in such a way that, in the suction position, it closes the ventilation opening, i.e., seals it, and in particular opens a fluidic connection between the vacuum supply opening and the suction opening. In this respect, in the suction position, a vacuum can be applied to the valve chamber, and thus the suction opening and the suction connection.

The valve body is designed such that it closes, i.e., seals, the vacuum supply opening in the ventilation position, and in particular opens a fluidic connection between the ventilation opening and the suction opening. In this respect, the valve chamber can be ventilated via the ventilation opening; in particular, a vacuum prevailing in the valve chamber can be reduced-preferably by ambient air flowing in through the ventilation opening.

The valve apparatus can in particular have a first valve seat on which the valve body rests in the suction position, and a second valve seat on which the valve body rests in the ventilation position. The first and/or the second valve seats can be designed, for example, as a plate seat, a flat seat, or a ball seat.

The valve apparatus also comprises an actuator for driving a displacement movement of the valve body along the switching axis between the suction position and the ventilation position.

The actuator comprises an armature, and in particular a magnetic armature, connected to the valve body, which armature can be displaced along the switching axis. In particular, the armature comprises a magnetically polarizable, and preferably ferromagnetic, material. However, the armature can also be formed in multiple parts. The armature can be designed as one piece, and in particular monolithically, with the valve body. The armature is preferably guided in a running sleeve in the valve housing and/or in the actuator.

The actuator also comprises an electromagnetic coil for driving a displacement movement of the armature, and thus of the valve body, along the switching axis. In particular, the armature and thus the valve body can be displaced along the switching axis by energizing the electromagnetic coil.

The actuator is designed to be bistable. In particular, the actuator comprises devices by means of which the armature is fixed in a corresponding end position. As explained in detail below, the actuator can comprise, for example, a spring device and/or one or more permanent magnets.

The valve apparatus also comprises a swing check valve for opening and closing the vacuum supply opening. The swing check valve is designed and arranged such that it can assume a closed position in which the vacuum supply opening is covered by the swing check valve, and an open position in which the vacuum supply opening is open at least in portions. In particular, starting from the closed position, the swing check valve can swing open and/or away from the valve chamber in the direction of the open position. The swing check valve is designed and arranged such that it can be transferred into the open position by applying vacuum to the vacuum connection, and in particular by the air flow connected thereto from the vacuum supply opening to the vacuum connection—in particular, it can swing open in the direction away from the valve chamber.

The proposed valve apparatus with a swing check valve enables reliable and operationally secure functioning. In particular, a safety function can be realized by the swing check valve, since, even in the event of a power failure or a drop in the vacuum at the vacuum connection (for example, due to a defect or power failure in the vacuum generating device), the vacuum in the valve chamber and thus in a suction grip device connected to the valve apparatus can be maintained. This safety function is also supported by the design of the actuator as a bistable actuator, so that the valve body remains fixed in its two end positions—suction position and ventilation position-without the coil needing to be energized for this purpose. In this way, the valve body can also be held securely in the corresponding switching position even in the event of a power failure. The proposed embodiment with an electrically controllable actuator also enables a particularly fast and energy-efficient switching of the valve apparatus, and in particular without requiring an additional compressed air supply. Since the actuator is designed to be bistable, the coil needs to be energized only for switching between the suction position and the ventilation position. The actuator can therefore be designed to be comparatively compact; the coil can be subjected to a high overcurrent, without overheating, because the energization during the switch is brief.

The swing check valve can be arranged in particular in the valve housing. In this respect, the swing check valve can be protected from environmental influences, which favors a reliable function of the valve apparatus. The swing check valve is preferably arranged outside the valve chamber. In particular, the swing check valve can be arranged in a fluidic connection, e.g., a flow channel, between the vacuum supply opening and the vacuum connection. For example, it is conceivable that the swing check valve be arranged on an outer side of a wall delimiting the valve chamber, and in particular in such a way that the swing check valve can be lifted off the wall, at least in portions, by the flow pressure as a result of a vacuum being applied to the vacuum connection. The swing check valve can be formed from an elastomer. The swing check valve can also be designed as a ball check valve.

The valve housing can be designed in one piece, and in particular as a single piece. The valve housing can also have a multipart design. In the context of an advantageous development, the valve apparatus can have an inner housing which delimits the valve chamber, and an outer housing which provides the vacuum connection and the suction connection. In particular, the outer housing can bound, and preferably enclose, the inner housing towards the outside. In this connection, it is conceivable, for example, that the inner housing and the valve chamber be part of a cartridge valve which is inserted into an outer housing. The outer housing can be an injection-molded part, for example.

In an embodiment of the valve apparatus with an inner housing, the swing check valve can then be arranged, for example, on an outer wall of the inner housing—in particular, in such a way that the swing check valve can be lifted off of the outer wall, at least in portions, by flow pressure, and in particular in the direction away from the valve chamber—by a vacuum being applied to the vacuum connection. The outer housing can optionally form a stop for the swing check valve.

In the context of an advantageous development, the actuator can be arranged in particular in the valve housing, such that the armature penetrates into the valve chamber through the ventilation opening. Such an embodiment can facilitate a sealing, since no additional sealing ring is required for sealing the armature. In this way, friction forces during the movement of the armature can also be reduced, which reduces the required switching forces. The actuator can thus be dimensioned particularly small, which further reduces the overall dimensions of the valve apparatus. In particular, the ventilation opening can be arranged coaxially with the switching axis.

In this connection, it can also be advantageous if the armature is radially tapered in the region of the ventilation opening, and in particular in such a way that a venting gap is formed between the armature and a wall portion of the valve housing—for example, of the inner housing—delimiting the ventilation opening, which venting gap surrounds—in particular, completely—the armature radially around the switching axis. In this respect, the ventilation opening can be designed such that ambient air can flow around the armature into the valve chamber. Such an embodiment makes it possible to supply comparatively high air volumes to the valve chamber despite the small installation space, which favors rapid switching (in particular, for setting down an object held by a suction grip device) and at the same time a compact structure.

Furthermore, it can be advantageous if the ventilation opening is fluidically connected to an atmospheric ventilation connection which encloses the armature about the switching axis. The ventilation connection can advantageously be arranged along the switching axis between the valve chamber and the coil.

In the context of an advantageous development, the ventilation connection can comprise a filter, and in particular an integrated filter, which radially encloses the switching axis, and in particular the armature. The filter can preferably be designed in the form of a filter cylinder. In particular, the filter cylinders and armature can be arranged coaxially with the switching axis.

Preferably, the filter and/or the filter cylinder comprise(s) a peripheral filter surface and an axial filter opening (cylinder opening) communicating with the ventilation opening, and in particular with a fluidic connection. The armature can then penetrate into the cylinder opening. In the context of an advantageous development, the valve housing can have a recess in the region of the filter such that ambient air can flow through the peripheral filter surface along a majority of its circumference around the switching axis, and preferably along its entire circumference around the switching axis. In this way, a large air passage surface is formed with comparatively small installation space.

A particularly advantageous arrangement of the valve openings can arise if the vacuum supply opening and the ventilation opening are arranged opposite one another on the valve chamber. The ventilation opening and the vacuum supply opening are preferably arranged coaxially with the switching axis. This allows a simple linear guidance of the valve body. Furthermore, it can be advantageous if the vacuum supply opening and the suction opening are arranged offset orthogonally to one another.

In the context of an advantageous development, the bistable design of the actuator can be realized by providing a spring device and a permanent magnet. Specifically, the actuator can comprise a spring device bearing on the armature along the switching axis, and a permanent magnet which holds the actuator in the suction position or in the ventilation position against the force of the spring device. Such an embodiment allows the valve apparatus to be held in a secure valve state (suction position or ventilation position) even in the event of power failure. Preferably, the spring device is designed to bear on the armature in the direction of the ventilation position of the valve body. The permanent magnet can then be designed to arrest the armature in the suction position against the force of the spring device. The permanent magnet is preferably designed and arranged in such a way that a magnetic holding force exerted on the armature in the suction position is greater than the sum of the spring force by the spring device and suction force resulting from a vacuum applied to the vacuum supply opening.

The permanent magnet can advantageously be enclosed in iron and/or arranged in a coil interior of the coil. In this way, the effect of the magnetic force and the mechanical stability when the force is applied to the armature can be improved. In addition, an arrangement in the interior of the coil allows a particularly compact design of the actuator.

Furthermore, it can be advantageous if the spring device and the permanent magnet, and in particular the coil, are arranged outside the valve chamber. The valve chamber can in this respect be designed to be particularly small, which reduces dead volumes and thus switching times (since less volume has to be evacuated or ventilated).

In the context of an alternative advantageous embodiment, for realizing the bistable design of the actuator, the actuator can comprise a first permanent magnet which holds the armature in the suction position and a second permanent magnet which holds the armature in the ventilation position. In such an embodiment, the spring device can then optionally be omitted.

In the context of a further alternative advantageous embodiment, for realizing the bistable design of the actuator, the actuator can comprise a permanent magnet and one or more flux-conducting structures, and in particular magnetic brackets, for conducting a magnetic flux of the permanent magnet. In particular, the at least one flux-conducting structure can be designed to direct a magnetic field of the permanent magnet in such a way that, in one or both end positions of the armature (suction position and/or ventilation position), a magnetic holding force is exerted on the armature which holds the armature against displacement from the end position. The permanent magnet can preferably be arranged centrally, with respect to a longitudinal extension of the armature, along the switching axis. The permanent magnet can also enclose the armature about the switching axis.

In the context of a general aspect, the valve apparatus can also comprise a sensor device. The sensor device is preferably arranged in the valve housing—for example, in the outer housing. The sensor device can in particular be designed to detect a pressure prevailing in the valve chamber. The valve chamber can then have a sensor opening which is fluidically connected to the sensor device.

Furthermore, the valve apparatus can have a valve control device, and in particular a control circuit board, which works together in particular with the sensor device. The valve control device is configured in particular to control the actuator, and in particular the coil—in particular as a function of a signal of the sensor device. The valve control device, and in particular the control circuit board, is preferably arranged in the valve housing.

The valve apparatus can also comprise an evaluation device which works together with the sensor device and/or the valve control device. The evaluation device can in particular be designed to generate, as a function of a pressure, detected by the sensor device, in the valve chamber, a signal which represents a suction state of a suction grip device connected at the suction connection. For example, it is conceivable that the evaluation device be configured to compare a pressure, detected by the sensor device, in the valve chamber with a pressure threshold value which is stored or can be stored in the evaluation device, and, as a function of whether the pressure in the valve chamber falls below or exceeds the pressure threshold value, to generate a corresponding signal. For example, when an absolute pressure prevailing in the valve chamber is less than the pressure threshold value (adequate vacuum), a signal can be generated indicating that an object is securely held by the suction grip device, and then, if the absolute pressure is greater than the pressure threshold value (vacuum too low), a signal is generated which indicates that the object is no longer suctioned or is no longer reliably suctioned by the suction grip device. In this way, status monitoring is possible.

Additionally or alternatively, the evaluation device can be configured to generate an evaluation signal as a function of a sensor signal provided by the sensor device, which signal causes the sensor device to control the actuator, and in particular the coil. For example, it is conceivable that the evaluation device be configured to analyze a sensor signal provided by the sensor device which represents a pressure in the valve chamber, to determine whether the pressure prevailing in the valve chamber falls below or exceeds a pressure threshold value which is stored or can be stored in the evaluation device. For example, if an (absolute) pressure prevailing in the valve chamber is greater than the pressure threshold value (vacuum too low), an evaluation signal can be generated which causes the valve control device to control the actuator in such a way that the valve body is transferred into the ventilation position.

In addition, it is conceivable that the valve apparatus, in addition to the sensor device described above, comprise further sensors for detecting process and/or state data of the valve apparatus—for example, a temperature sensor, a voltage sensor, a current sensor on the coil, and/or an armature position sensor (for example, a tactile sensor or Hall sensor). The evaluation device can then be designed to evaluate data determined by the sensor device and/or one or more of the further sensors, and, for example, to determine therefrom a contamination or wear state (for example, by detecting a switching time of the valve apparatus changing over a period of time).

The valve apparatus can also comprise one or more state displays—for example, in the form of light displays (for example, LED's or screens). The state displays can, for example, be designed to display a variety of state or process information to an operator—for example, a switch-on state of the valve, an error state, a switching state of the valve, a suction state of a workpiece held on the suction grip device, and/or a current vacuum value in the valve chamber.

The valve apparatus can also comprise a communications interface. The communications interface can be configured to transmit information provided by the sensor device, the valve control device, and/or the evaluation device, and in particular process and state information of the valve apparatus, to an external evaluation or control unit, and/or to receive information, e.g., control signals or setting values for the pressure threshold values, from an external evaluation or control unit. The communications interface can be designed for wireless communication, e.g., via an NFC interface, and/or for wired communication.

The above object is also achieved by a vacuum handling apparatus comprising a vacuum generating device and one or more gripper devices. Each of the gripper devices comprises a suction grip device and a valve apparatus described above. A valve apparatus is assigned to each suction grip device. Each suction grip device is fluidically connected to the suction connection of the valve apparatus assigned thereto. Each valve apparatus is fluidically connected to the shared vacuum generating device. In particular, the vacuum generating device is fluidically connected to the vacuum connection of a corresponding valve apparatus via a corresponding fluid line.

In this connection, it has been found to be particularly advantageous if the valve apparatus is arranged closer to the suction grip device assigned thereto than to the vacuum generating device. In this way, dead volumes between the valve apparatus and the suction grip device can be reduced, which has a positive effect on the switching times (less volume must be suctioned off or ventilated during the switch).

Each valve apparatus is also connected to the vacuum generating device via an—in particular, corresponding—communications connection—in particular, for the exchange of data. For example, the vacuum generating device can communicate via the above-mentioned communications interface of a corresponding valve apparatus.

The suction grip device can, for example, be a single suction device, a vacuum gripper, or a suction spider.

In the context of an advantageous development, the vacuum generating device can have a main control device. The main control device can in particular be configured to process, and in particular evaluate, process and/or state data of the valve apparatuses. In this connection, it can be advantageous if the valve control device of a corresponding valve apparatus is configured to transmit process and/or state data of the valve apparatus assigned thereto, and in particular directly to the main control device of the vacuum generating device. Additionally or alternatively, the main control device can be configured to transmit control signals for actuating the valve apparatus or valve apparatuses to the corresponding valve control unit of the valve apparatus. The control signals can in particular be signals for controlling the actuator and thus for switching the valve apparatus. In such an embodiment, the shared vacuum generating device can thus monitor the state of the valve apparatuses and, if necessary—for example, in dangerous situations—actuate the valve apparatuses individually. Such a main control device also has the advantage that state data can be read and processed centrally, so that malfunctions can be centrally evaluated.

BRIEF DESCRIPTION OF THE DRAWINGS

The invention is explained in more detail below with reference to the figures. In the drawings:

FIG. 6 is a schematic representation for explaining an exemplary operating situation of the vacuum handling apparatus according to FIG. 4.

DETAILED DESCRIPTION

In the following description and in the figures, identical reference signs are in each case used for identical or corresponding features.

Figure 1:
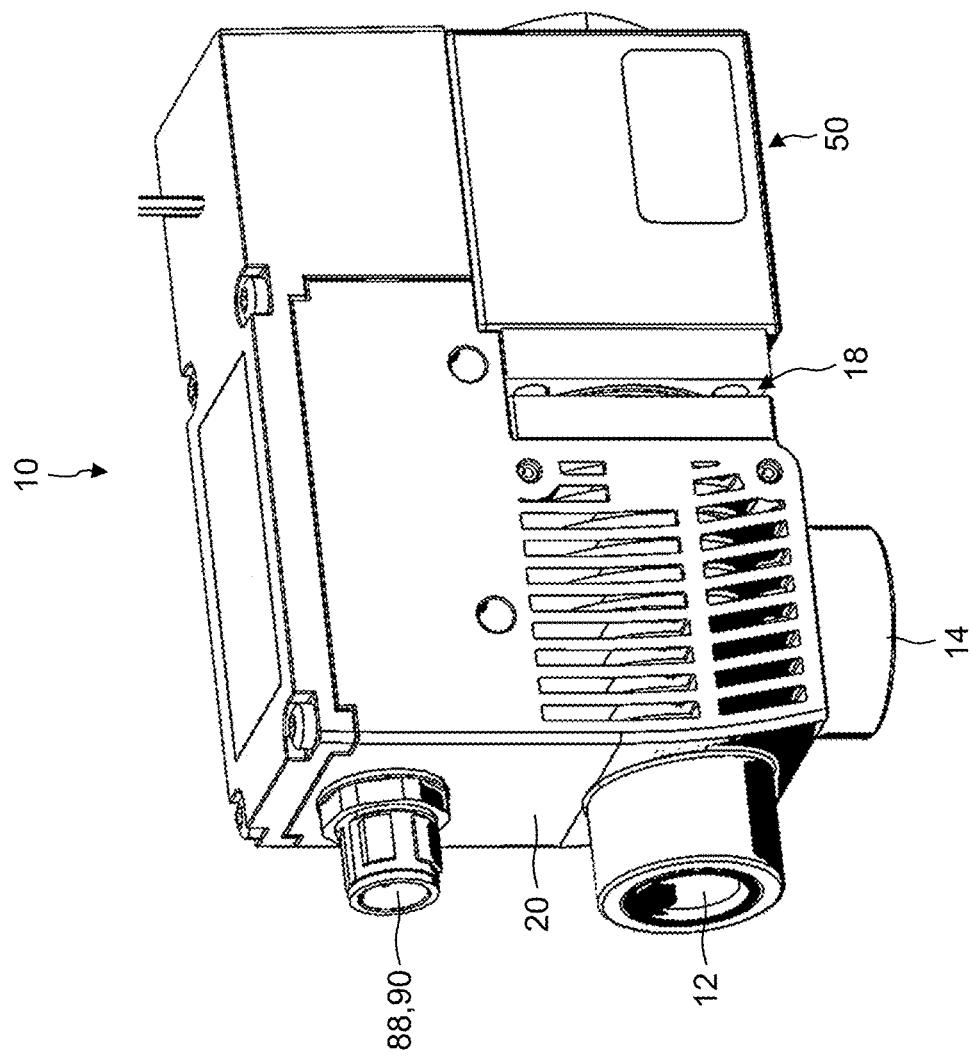
FIG. 1 is a sketched representation of an embodiment of the valve apparatus in a perspectival view.

FIG. 1 shows an embodiment of a valve apparatus, which is denoted as a whole by reference sign 10. The valve apparatus 10 comprises a vacuum connection 12 for connecting an external vacuum source, a suction connection 14 for connection to a suction grip device 16 (cf. FIG. 4), and a ventilation connection 18 for ventilating the valve apparatus 10. The valve apparatus 10 is designed to selectively establish a fluidic connection between the vacuum connection 12 and the suction connection 14, or between the ventilation connection 18 and the suction connection 14.

Figure 2:
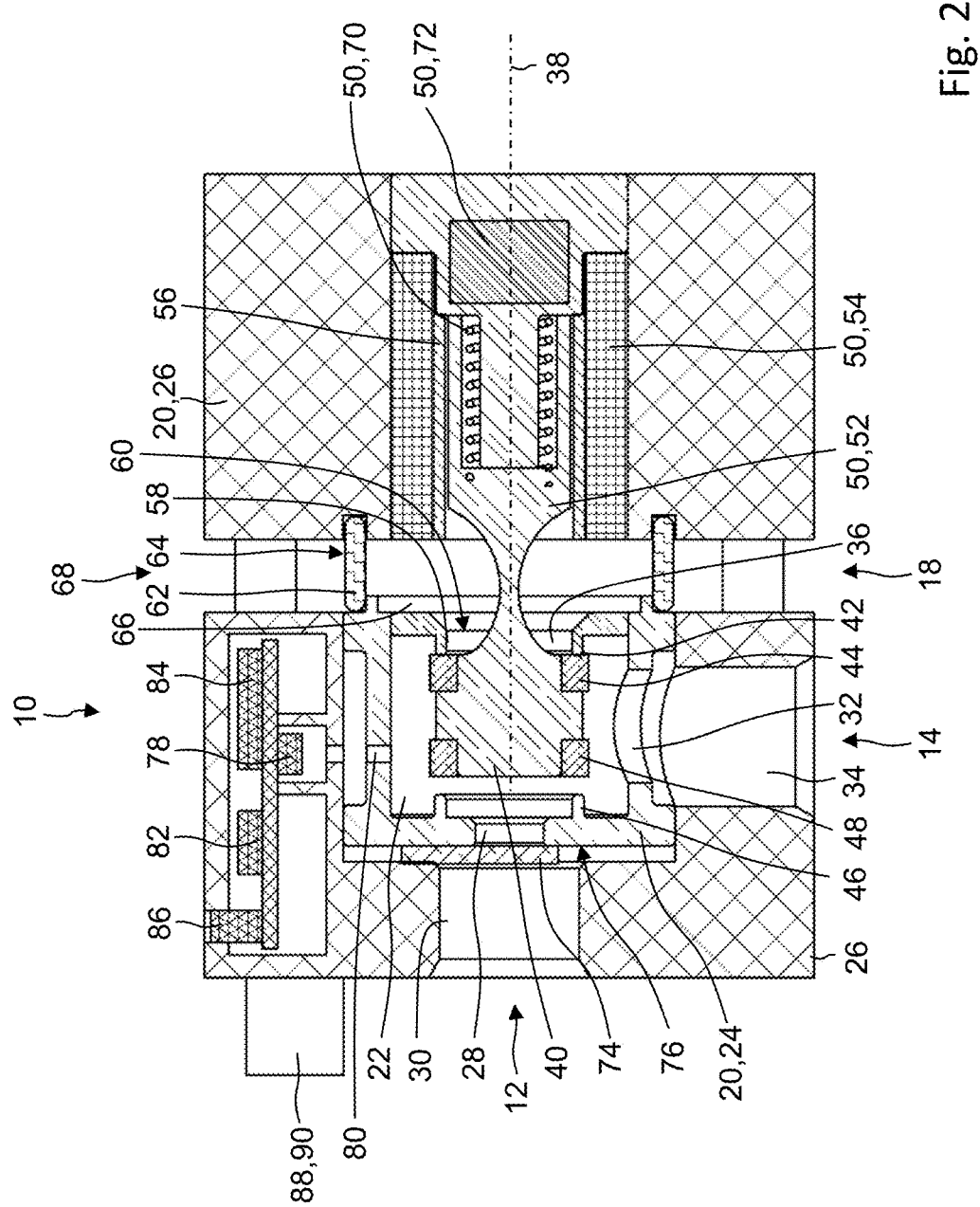
FIG. 2 is a schematic sectional view of the valve apparatus according to FIG. 1 with the valve body in the suction position.

The valve apparatus 10 has a valve housing 20 which encloses a valve chamber 22 (cf. FIG. 2). In the example shown, the valve housing 22 comprises an inner housing 24 which delimits the valve chamber 22 and an outer housing 26 which encloses the inner housing 24. As already mentioned, it is conceivable, for example, that the inner housing 24 be inserted into the outer housing 26. In embodiments not shown, it is also conceivable for the valve housing 20 to be formed in one piece.

As can be seen from FIG. 2, the valve chamber 22 comprises a vacuum supply opening 28 which is fluidically connected to the vacuum connection 12 via a flow channel 30. The valve chamber 22 also comprises a suction opening 32 which is fluidically connected to the suction connection 14 via a flow channel 34. The valve chamber 22 also comprises a ventilation opening 36 for ventilating the valve chamber 22. The ventilation opening 36 can be supplied with ambient air via the ventilation connection 18 (explained in detail below).

In the example shown, the vacuum supply opening 28, the suction opening 32, and the ventilation opening 36 are each formed by a recess in the inner housing 24.

By way of example and preferably, the vacuum supply opening 28 and the ventilation opening 36 are arranged coaxially with a switching axis 38 of the valve apparatus 10 (explained in detail below). By way of example, the suction opening 32 is oriented orthogonally to the vacuum supply opening 28 and the ventilation opening 36.

Figure 3:
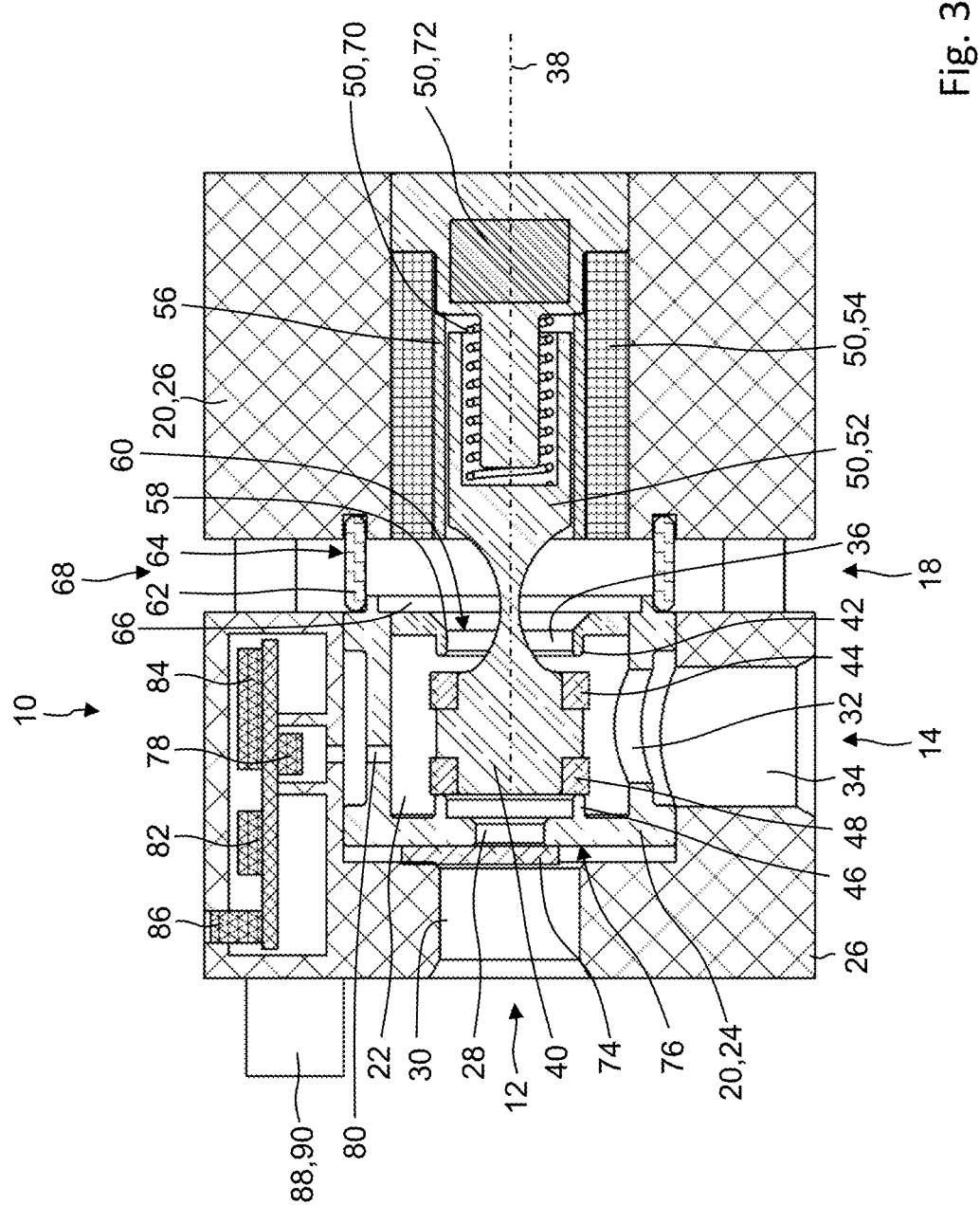
FIG. 3 is a schematic sectional view of the valve apparatus according to FIG. 1 with the valve body in the ventilation position.

The valve apparatus 10 further comprises a valve body 40 which is arranged in the valve chamber 22. The valve body 40 can be displaced along the switching axis 38 between a suction position (cf. FIG. 2) and a ventilation position (cf. FIG. 3).

In the suction position, the valve body 40 is arranged such that it closes the ventilation opening 36, and at the same time a fluidic connection between the vacuum supply opening 28 and the suction opening 32 is established (cf. FIG. 2). In this switching position of the valve apparatus 10, a suction grip device 16 connected to the suction connection 14 can be supplied with vacuum and thus, for example, an object can be suctioned. In the specific example, the valve body 40 in the suction position rests with a seal against a first valve seat 42. For this purpose, in the example shown, the valve body 40 comprises a first sealing means 44—for example, in the form of an O-ring.

In the ventilation position (cf. FIG. 3), the valve body 40 is arranged such that it closes the vacuum supply opening 28 and at the same time allows a fluidic connection between the ventilation opening 36 and the suction opening 32. In this switching position of the valve apparatus 10, a suction grip device 16 connected to the suction connection 14 can be ventilated again via the ventilation opening 36, and, for example, the object can be set down in this way. In the specific example, the valve body 40 in the ventilation position rests with a seal against a second valve seat 46. For this purpose, the valve body 40 comprises a second sealing device 48—for example, in the form of an O-ring.

The valve apparatus 10 also comprises an actuator 50 for driving a displacement movement of the valve body 40 along the switching axis 38. The actuator 50 is in this respect designed to switch the valve apparatus 10.

The actuator 50 comprises an armature 52 and an electromagnetic coil 54 for driving a displacement movement of the armature 52 along the switching axis 38. The armature 52 comprises in particular a magnetically polarizable, and in particular ferromagnetic, material. In this respect, the armature 52 is in particular a magnet armature. By energizing the coil 54, the armature 52 and thus the valve body 40 can be displaced between the suction position (cf. FIG. 2) and the ventilation position (cf. FIG. 3). As can be seen from FIG. 2, the armature is preferably guided in a running sleeve 56 in the valve housing 20.

In the specific example, the armature 52 is formed integrally with the valve body 40. In embodiments not shown, however, it is also conceivable that the armature 52 and the valve body be separately provided components which are connected to one another.

By way of example and preferably, the armature 52 penetrates through the ventilation opening 36 into the valve chamber 22. Preferably, the armature 52 tapers radially in the region of the ventilation opening 36 in such a way that a venting gap 60 is formed between the armature 52 and a wall 58 delimiting the ventilation opening 36, which venting gap surrounds the armature 52 around the switching axis 38—in the example, completely (cf. FIG. 2).

As can be seen from FIG. 2, the ventilation connection 18 comprises a filter 62 in order to filter inflowing ambient air. By way of example and preferably, the filter 62 is designed in the form of a filter cylinder which radially encloses the switching axis 38 and the armature 52. Specifically, the filter 62 has a peripheral filter surface 64 and an axial filter opening 66 which is fluidically connected to the ventilation opening 36. As can be seen from FIG. 2, the valve housing 20 has a recess 68 in the region of the filter 62 such that ambient air can flow through the peripheral filter surface 64 along a majority of its circumference around the switching axis 38—in the example, along its entire circumference around the switching axis 38.

The actuator 50 is designed to be bistable, so that the armature 52 and thus the valve body 40 are fixed in the two end positions (suction position and ventilation position) without the coil 54 being energized. In the specific example, the actuator 50 comprises a spring device 70, e.g., in the form of a helical spring, which acts upon the armature 52 and thus the valve body 40 in the direction of the ventilation position (cf. FIG. 3). The actuator 50 also comprises a permanent magnet 72 which is designed to retain the armature 52 and thus the valve body 40 in the suction position against the spring force of the spring device 70 (cf. FIG. 2). In this respect, the coil 54 must be energized only briefly for switching the valve apparatus 10.

In embodiments not shown, it is also conceivable for the actuator 50 to comprise a first permanent magnet which holds the armature 52 in the suction position, and a second permanent magnet which holds the armature 52 in the ventilation position.

As can be seen from FIG. 2, the valve apparatus 10 also comprises a swing check valve 74 for opening and closing the vacuum supply opening 28. In the specific example, the swing check valve 74 is arranged on an outer wall 76 of the inner housing 24. FIG. 2 shows the swing check valve 74 in a closed position in which the swing check valve 74 closes the vacuum supply opening 28. The swing check valve 74 is designed such that it can be transferred from this closed position into an open position in which the vacuum supply opening 28 is open at least in portions. Specifically, the swing check valve 74 is designed in particular in such a way that it can swing open in the direction of the valve chamber 22 by the application of a vacuum to the vacuum connection 12, and an air flow connected therewith from the vacuum supply opening 28 to the vacuum connection 14, and can thus be transferred into the open position.

The valve apparatus 10 also comprises a sensor device 78 which is designed to detect a pressure prevailing in the valve chamber 22. For this purpose, the sensor device 78 is fluidically connected to the valve chamber 22 via a sensor opening 80.

The valve apparatus 10 preferably also comprises a control device 82 which works together with the sensor device 78 and is designed to control the actuator 50—in particular, as a function of a signal of the sensor device 78.

As mentioned above, the valve apparatus 10 preferably also comprises an evaluation device 84 interacting with the sensor device 78 and the control device 82.

As can be seen from FIG. 2, the sensor device 78, the control device 82, and the evaluation device 84 are preferably arranged in the valve housing 20 and are thus protected from environmental influences. Optionally, a state display 86, e.g., in the form of an LED or a screen, can also be provided which is designed to display state and process information to an operator.

The sensor device 78, the control device 82, the evaluation device 84, and/or the state display 86 can be part of a control circuit board.

As mentioned above, the valve apparatus 10 also comprises a communications interface 88 for communicating with an external evaluation or control unit (for example, with the main control device 106 of a vacuum generating device 104; see below). In the specific example, the communications interface 88 comprises a plug connection 90. Alternatively or additionally, the communications interface 88 can also have a wireless communications device—for example, in the form of an NFC antenna.

The use of a valve apparatus 10 described above in a vacuum handling apparatus 100 is described below with reference to FIGS. 4 through 6.

Figure 4:
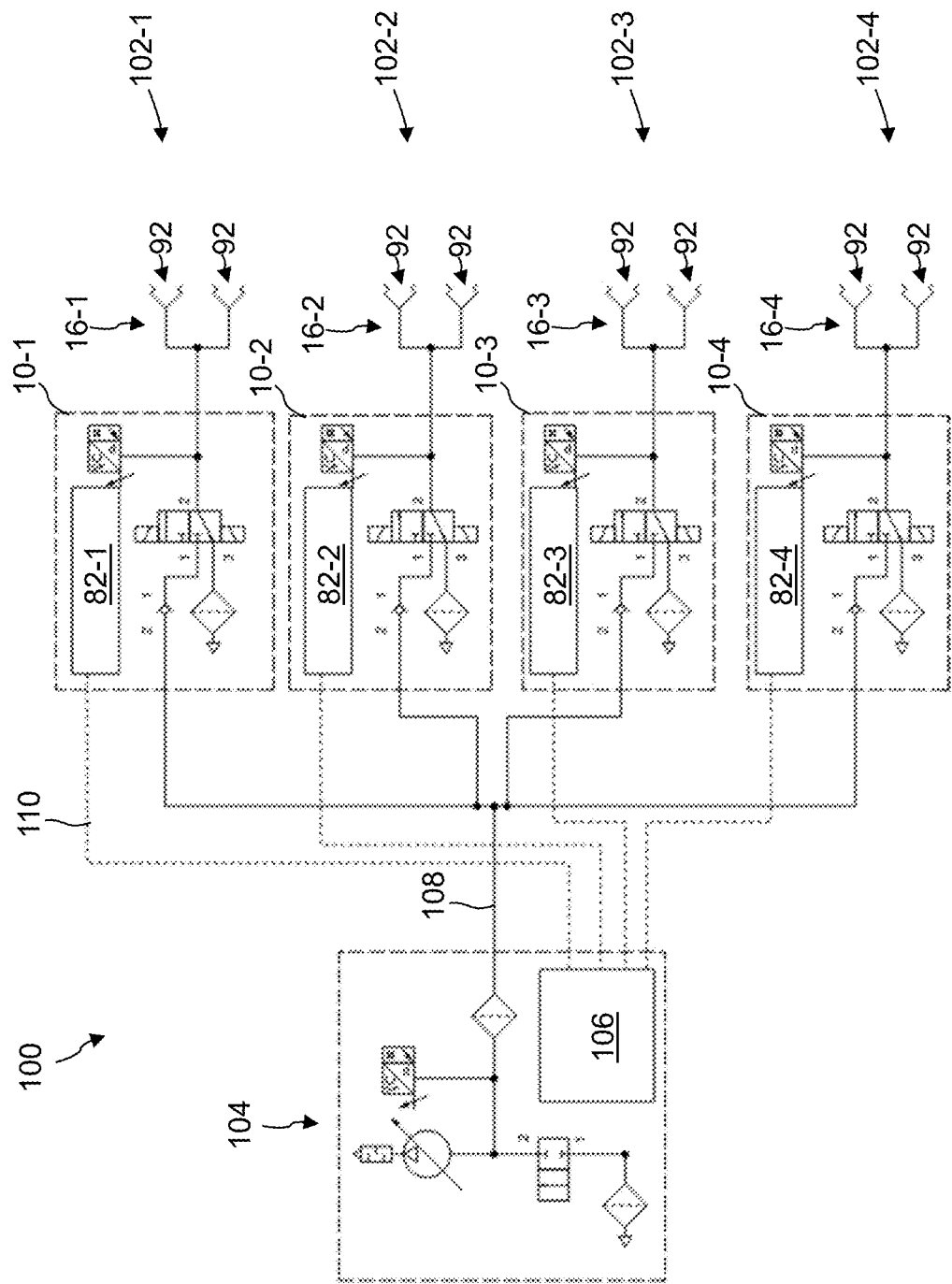
FIG. 4 is a schematic circuit diagram of an exemplary embodiment of a vacuum handling apparatus.

FIG. 4 is a schematic circuit diagram of a vacuum handling apparatus, which is denoted overall by reference sign 100. The vacuum handling apparatus 100 comprises one or more—in the example, four-gripper devices 102-1, 102-2, 102-3, 102-4. Each gripper device 102-1, 102-2, 102-3, 102-4 comprises a valve apparatus 10-1, 10-2, 10-3, 10-4 and a suction grip device 16-1, 16-2, 16-3, 16-4 described above. The suction grip devices 16-1, 16-2, 16-3, 16-4 each have two suction points 92 by way of example.

The vacuum handling apparatus 100 also comprises a central vacuum generating device 104 that is common to all gripper devices 102-1, 102-2, 102-3, 102-4. The vacuum generating device 104 can, for example, be an electrical vacuum generating device 104, such as a blower. The vacuum generating device 104 comprises a main control device 106 which is designed to control the valve apparatuses 10-1, 10-2, 10-3, 10-4.

As shown in FIG. 4, the vacuum generating device 104 is fluidically connected via corresponding fluid lines 108 to the vacuum connections 12 of the valve apparatuses 10-1, 10-2, 10-3, 10-4. The valve apparatuses 10-1, 10-2, 10-3, 10-4 are preferably arranged in the vicinity of a suction gripper, which reduces the dead volumes between valve apparatus 10-1, 10-2, 10-3, 10-4 and suction grip device 16, and thus switching times.

Furthermore, the individual valve control devices 82-1, 82-2, 82-3, 82-4 are connected to the main control device 106—in particular, for data exchange-via corresponding communications connections 110 (shown in FIG. 4 with dashed lines), in a wireless or wired manner. For example, it is conceivable that the valve apparatuses 10-1, 10-2, 10-3, 10-4 be connected to the main control device 106 via the corresponding communications interface 88 described above.

As mentioned above, the main control device 106 is configured to evaluate process and/or state data of the valve apparatuses 10-1, 10-2, 10-3, 10-4 transmitted to the main control device 106 by the valve control devices 82-1, 82-2, 82-3, 82-4. The main control device 106 is furthermore configured to transmit control signals for actuating the valve apparatuses 10-1, 10-2, 10-3, 10-4 to the valve control devices 82-1, 82-2, 82-3, 82-4 of the valve apparatuses 10-1, 10-2, 10-3, 10-4.

An exemplary application situation of the vacuum handling apparatus 100 is explained in more detail below with reference to FIGS. 5 and 6.

Figure 5:
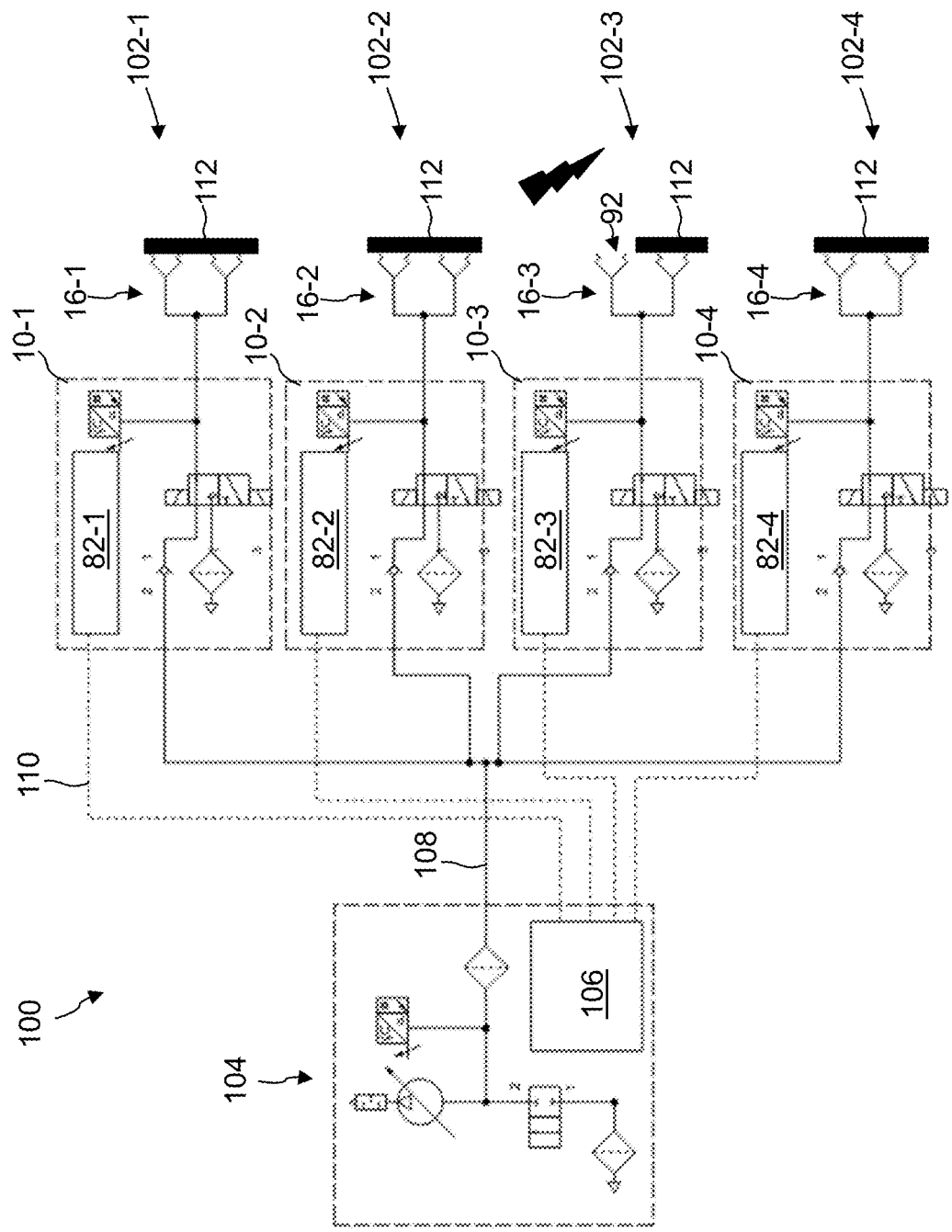
FIG. 5 is a schematic representation for explaining an exemplary operating situation of the vacuum handling apparatus according to FIG. 4.

FIG. 5 shows an exemplary operating state of the vacuum handling apparatus 100, in which a leakage occurs at a suction point 92 (in the example, at one of the suction points 92 of the suction grip device 16-3 of the third gripper device 102-3)—for example, as a result of an unintended drop of an object 112. Due to the leakage, the vacuum in the valve chamber 22 of the valve apparatus 10-3 decays, or the absolute pressure is increased in the valve chamber 22.

Since the gripper devices 102-1, 102-2, 102-3, 102-4 are fluidically connected to one another via the shared fluid lines 108, the pressure difference thus created first leads to the swing check valves 74 of the further valve apparatuses 10-1, 10-2, 10-4 being transferred into the corresponding closed position, so that the suction grip devices 16-1, 16-2, 16-4, working together with these valve apparatuses 10-1, 10-2, 10-4, can continue to grip the objects 112 securely.

The unintentional pressure change in the valve apparatus 10-3 is detected by the sensor device 78 of this valve apparatus 10-3 and finally reported to the main control device 106 of the vacuum generating device 104 by the valve control device 82-3 of this valve apparatus 10-3. The main control device 106 can then transmit a control signal to the valve control device 82-3 of this valve apparatus 10-3 via the corresponding communications connection 110 to the valve apparatus 10-3 in order to ventilate the valve apparatus 10-3, i.e., to transfer the valve body 40 from the suction position into the ventilation position (cf. FIG. 6). In the ventilation position, the vacuum supply opening 12 is then sealed, so that the leakage at the suction grip device 10-3 is no longer transmitted to the fluid lines 108 and thus no longer to the further gripper devices 102-1, 102-2, 102-4, so that a safe gripping state is again produced for these gripper devices 102-1, 102-2, 102-4 (illustrated by the black checkmarks in FIG. 6). If, as in the example, further objects 112 are held on the suction grip device 16-3 which is subject to leakage, they can optionally be sacrificed to protect all other held objects 112.

As mentioned above, it is also conceivable that the unplanned pressure change in the valve apparatus 10-3 be detected by the sensor device 78 of this valve apparatus 10-3, and the control device 82-3 of this valve apparatus 10-3 then control the actuator directly, i.e., without interposition of the main control device 106.

Persons skilled in the art will understand that the structures and methods specifically described herein and illustrated in the accompanying figures are non-limiting exemplary aspects, and that the description, disclosure, and figures should be construed merely as exemplary of aspects. It is to be understood, therefore, that the present disclosure is not limited to the precise aspects described, and that various other changes and modifications may be affected by one skilled in the art without departing from the scope or spirit of the disclosure. Additionally, it is envisioned that the elements and features illustrated or described in connection with one exemplary aspect may be combined with the elements and features of another without departing from the scope of the present disclosure, and that such modifications and variations are also intended to be included within the scope of the present disclosure. Indeed, any combination of any of the presently disclosed elements and features is within the scope of the present disclosure. Accordingly, the subject matter of the present disclosure is not to be limited by what has been particularly shown and described.

What is claimed is:

1. Valve apparatus (10) for vacuum applications, the valve apparatus comprising:
    a valve housing (20) delimiting a valve chamber (22), the valve chamber (22) including:
        a vacuum supply opening (28) which is fluidically connected to a vacuum connection (12) for connecting an external vacuum source;
        a suction opening (32) which is fluidically connected to a suction connection (14) for connecting a suction grip device (16); and
        a ventilation opening (36) for ventilating the valve chamber (22);
    a valve body (40) which is arranged in the valve chamber (22) and can be moved along a switching axis (38) between a suction position and a ventilation position, wherein the valve body (40) in the suction position closes the ventilation opening (36) and in the ventilation position closes the vacuum supply opening (28);
    a bistable actuator (50) for driving a displacement movement of the valve body (40) between the suction position and the ventilation position, comprising
        an armature (52) connected to the valve body (40) and displaceable along the switching axis (38); and
        an electromagnetic coil (54) for driving a displacement movement of the armature (52) along the switching axis (38);

a swing check valve (74) for opening and closing the vacuum supply opening (28), wherein the swing check valve (74) can assume a closed position and an open position,
wherein the swing check valve (74) can be transferred into the open position by applying vacuum to the vacuum connection (12).

2. Valve apparatus (10) according to claim 1, wherein the swing check valve (74) is arranged in the valve housing (20) between the vacuum supply opening (28) and the vacuum connection (12).

3. Valve apparatus (10) according to claim 1, wherein the valve housing (20) comprises an inner housing (24) which delimits the valve chamber (22), and an outer housing (26) which provides the vacuum connection (12) and the suction connection (14).

4. Valve apparatus according to claim 3, wherein the swing check valve (74) is arranged on an outer wall (76) of the inner housing (24), and in particular in such a way that the swing check valve (74) can be lifted off the outer wall (76), at least in portions, by the flow pressure as a result of a vacuum being applied to the vacuum connection (12).

5. Valve apparatus (10) according to claim 1, wherein the armature (52) penetrates through the ventilation opening (36) into the valve chamber (22).

6. Valve apparatus (10) according to claim 5, wherein the armature (52) tapers radially in the region of the ventilation opening (36) in such a way that a venting gap (60) completely surrounds the armature (52) around the switching axis (38).

7. Valve apparatus (10) according to claim 1, wherein the ventilation opening (36) is fluidically connected to an atmospheric ventilation connection (18), wherein the ventilation connection (18) comprises a filter (62) in the form of a filter cylinder which surrounds the switching axis (38), and the armature (52).

8. Valve apparatus (10) according to claim 7, wherein the filter cylinder (62) has a peripheral filter surface (64) and an axial filter opening (66) fluidically connected to the ventilation opening (36), wherein the valve housing (20) has a recess (68) in the region of the filter (60) such that ambient air can flow through the peripheral filter surface (64) along a majority of its circumference around the switching axis (38).

9. Valve apparatus (10) according to claim 1, wherein the vacuum supply opening (28) and the ventilation opening (36) are arranged opposite one another on the valve chamber (22) and/or wherein the vacuum supply opening (28) and the suction opening (32) are arranged offset orthogonally to one another.

10. Valve apparatus (10) according to claim 1, wherein the bistable actuator (50) further comprises:
a spring device (70) which bears on the armature (52) along the switching axis (38), and in particular in the direction of the ventilation position of the valve body (40);
a permanent magnet (72) which holds the armature (52) in the suction position or in the ventilation position against the force of the spring device (70).

11. Valve apparatus (10) according to claim 10, wherein the coil (54), the spring device (70), and the permanent magnet (72) of the actuator (50) are arranged outside the valve chamber (22).

12. Valve apparatus (10) according to claim 1, the bistable actuator (50) further comprising:

a first permanent magnet which holds the armature (52) in the suction position;
a second permanent magnet which holds the armature (52) in the ventilation position.

13. Valve apparatus (10) according to claim 1, further comprising a sensor device (78) which is designed to detect a pressure prevailing in the valve chamber (22), wherein the valve chamber (22) has a sensor opening (80) fluidically connected to the sensor device (78).

14. Valve apparatus (10) according to claim 1, further comprising an evaluation device (84) which works together with the sensor device (78) and is configured to generate a signal, which represents a suction state of a suction grip device (16) connected to the suction connection (14), as a function of a pressure, detected by the sensor device (78), in the valve chamber (22), and in particular wherein the evaluation device (84) is configured to compare a pressure, detected by the sensor device (78), in the valve chamber (22) with a pressure threshold value which is stored or can be stored in the evaluation device (84), and, as a function of whether the pressure in the valve chamber (22) falls below or exceeds the pressure threshold value, to generate a corresponding signal.

15. Valve apparatus (10) according to claim 1, further comprising a valve control device (82), and in particular a control circuit board, which works together in particular with the sensor device (78) and/or the evaluation device (84) and is arranged in the valve housing (20), and which is designed to control the actuator (50) in particular as a function of a signal of the sensor device (78) and/or the evaluation device.

16. Vacuum handling apparatus (100), comprising:
a vacuum generating device (104); and
one or more gripper devices (102-1, 102-2, 102-3, 102-4), each comprising a suction grip device (16-1, 16-2, 16-3, 16-4), and a valve apparatus (10-1, 10-2, 10-3, 10-4) according to claim 1, wherein the suction grip device (16-1, 16-2, 16-3, 16-4) is fluidically connected to the suction connection (14) of the valve apparatus (10-1, 10-2, 10-3, 10-4), wherein the vacuum generating device (104) is fluidically connected to the vacuum connection (12) of the valve apparatus (10-1, 10-2, 10-3, 10-4), and wherein the vacuum generating device (104) is connected to the valve apparatus (10-1, 10-2, 10-3, 10-4) via a data line (110) for data exchange.

17. Vacuum handling apparatus (100) according to claim 16, wherein each valve apparatus (10-1, 10-2, 10-3, 10-4) has its own valve control device (82-1, 82-2, 82-3, 82-4), and wherein the vacuum generating device (104) has a main control device (106), wherein the valve control device (82-1, 82-2, 82-3, 82-4) of a corresponding valve apparatus (10-1, 10-2, 10-3, 10-4) is configured to transmit process and/or state data of the valve apparatus (10-1, 10-2, 10-3, 10-4) to the main control device (106) of the vacuum generating device (104), and wherein the main control device (106) is configured to process, and in particular evaluate, process and/or state data, and wherein the main control device is configured to transmit control signals for actuating the valve apparatuses (10-1, 10-2, 10-3, 10-4), and in particular for actuating the actuator (50) of the valve apparatus, directly to the corresponding valve control devices (82-1, 82-2, 82-3, 82-4) of the valve apparatuses (10-1, 10-2, 10-3, 10-4).

* * * * *